7780X
Sheet 1 - 2 Sheets.
J. Abbott
Hydraulic Engine,
Patented Nov. 19, 1833.
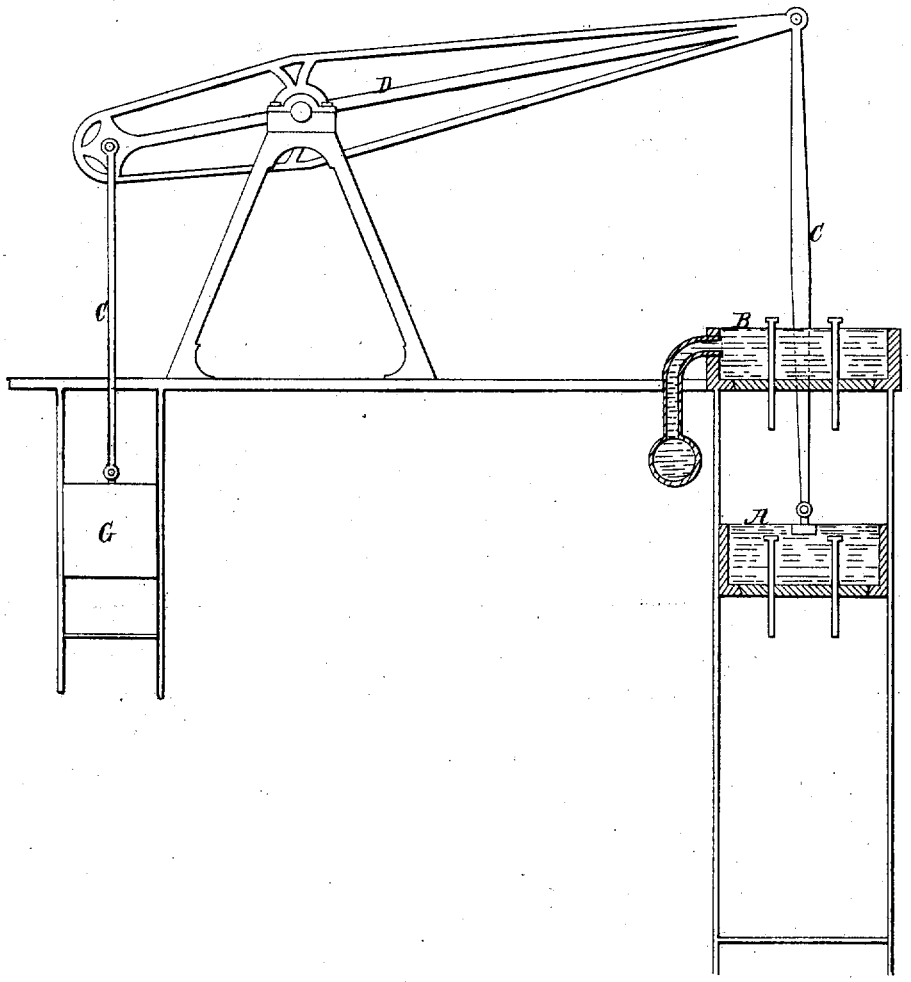
N. PETERS, PHOTO-LITHOGRAPHER, WASHINGTON, D. C.

7780X
Sheet 2 - 2 Sheets
J. Abbott,
Hydraulic Engine,
Patented Nov. 19, 1833.
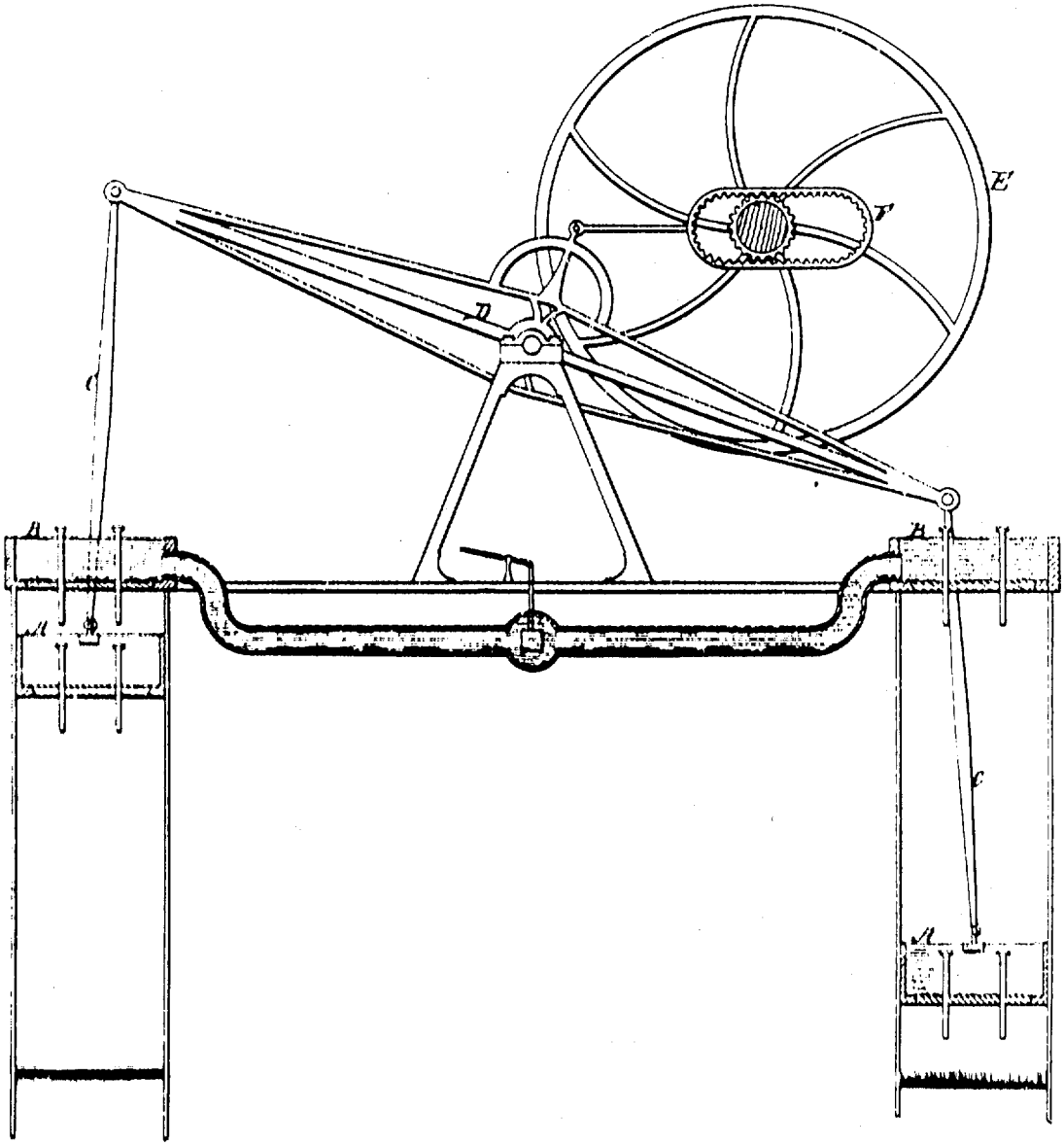
N. PETERS, PHOTO-LITHOGRAPHER, WASHINGTON, D.C.

7780X John Abbott Nov 19, 1833

The Schedule referred to in these Letters Patent and making part of the same containing a description in the words of the said John Abbott himself of his improvement in the mode of using Water power by a direct application of its weight to a lever beam or vibrating circle. To all to whom these presents shall come. Be it known that I John Abbott of Reading in the County of Middlesex and Commonwealth of Massachusetts Carpenter have invented a new mode of using Water power by a direct application of its weight to a lever beam or vibrating circle illustrated by the accompanying Model and specified in the words following, to wit. My invention consists in applying the weight of water at any given height to one or more buckets or vessels suspended by chains, rods or line gears and connected with a lever beam or operating on a vibrating circle or segment of a circle, said buckets or vessels being placed in a perpendicular direction in any open space and unconfined, but kept in their right line by guide rods and near a flume or any fountain of water. The water is let into one of the vessels or buckets at its height by its striking the spout or discharging orifice of the flume or fountain and opening a valve and being full it descends. and the valve closes, and by its descent it raises the alternate or opposite bucket or vessel. As soon as the descending bucket reaches the bottom of the fall its pressure against the bottom or against one or more [illegible] on the perpendicular guides causes one or more valves, in the circumference of the [illegible] [illegible] to the bottom, to open [illegible] the water is [illegible] discharging in a [illegible]. [illegible] [illegible] [illegible] of the vessels or buckets [illegible] [illegible]

to the lever beam or vibrating circle and as is shown in the accompanying model. the lever or vibrating circle (which is secured upon its own axis independent of the main shaft) and the suspending rods or line gears operate upon the main shaft by the means of pinion and ratchet wheels. The ratchet wheel is placed firmly on the main shaft, the pinion wheel revolves upon the same shaft and being acted upon alternately by the suspending rods or line gears, and striking a cog or spring on the ratchet keeps the main shaft revolving. A fly wheel of any diameter may be attached to the main shaft to regulate motion as the case may require. For the purpose of overcoming any tendency to check the alternate motions when the vessels are filling or discharging (being the point of time when a change of motion is effected) a pendulum may be introduced as in the accompanying model, the vibration of which gives additional force to the required motion, I do not consider the pendulum as indispensible but practice will determine the point. By this invention a greater power is obtained by a less quantity of water than by any other means known to the inventor and if properly constructed there need be no waste of water, and there is great economy, since a small excavation only being required to admit a free passage up and down of the buckets, and a race way to discharge the water, and the motion from the main shaft communicated by the vibrating circle or lever beam, may be extended immediately to the running gears of a mill without the expense of the heavy gears usually attached to water wheels, The use of this power may be indefinitely extended in addition to its application to mill falls, it may be applied at a small expense to artificial falls whereby the

[illegible]

[illegible] being raised to an elevation by any moving
[illegible] power (equal to an horse power for instance) may
acquire by the use of my hydraulic lever, an increased
power in proportion to its height, and it may also be
advantageously used for the raising of weights in ware
houses and other places where a fountain could be
had     Whatever may have been described in the fore
going specification, my whole invention consists in, and
all that I claim is the application of the weight of water
in a perpendicular line, upon one or more vessels, mov-
ing in an open space, connected with one or more lever
beam or beams or one or more vibrating circles or segments
of a circle, so as to communicate motion, and operate as
a substitute for the common water wheel, And also my invention
in the mode of gearing as is herein described, consists
in applying to any shaft one or more ratchet or pinion
wheels, connecting with and receiving motion from
lever gears either perpendicular horizontal or at an
angle, the ratchet wheel being firmly fixed on the
main shaft has a motion independent of the lever gears,
and is operated upon by the pinion (which revolves on
said shaft) when such operation is required, by me-
ans of a band fixed on the pinion, and causes the ratchet
to drive the main shaft, as the lever gear may rise
and fall or in any way operate upon it and this im-
provement in the mode of gearing, may be applied to
steam engines generally.     In testimony that the above
is a true specification of my said invention as above des-
cribed, I have hereto set my hand this eighteenth
day of September eighteen hundred and thirty three Witnesses
Thomas A [illegible]     John [illegible] [illegible]
[illegible] Richardson